US012793695B2

(12) United States Patent
Chang et al.

(10) Patent No.: US 12,793,695 B2
(45) Date of Patent: Nov. 10, 2026

(54) METHOD AND DEVICE FOR SYNTHESIZING MULTI-SPEAKER SPEECH USING ADVERSARIAL ARTIFICIAL NEURAL NETWORK

(71) Applicant: Industry-University Cooperation Foundation Hanyang University, Seoul (KR)

(72) Inventors: Joon-Hyuk Chang, Seoul (KR); Jaeuk Lee, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 550 days.

(21) Appl. No.: 17/898,991

(22) Filed: Aug. 30, 2022

(65) Prior Publication Data

US 2023/0076239 A1 Mar. 9, 2023

(30) Foreign Application Priority Data

Aug. 30, 2021 (KR) ........................ 10-2021-0115121

(51) Int. Cl.
*G10L 13/027* (2013.01)
*G10L 25/30* (2013.01)

(52) U.S. Cl.
CPC ............ *G10L 13/027* (2013.01); *G10L 25/30* (2013.01)

(58) Field of Classification Search
CPC ......... G10L 13/00; G10L 13/02; G10L 15/02; G10L 2015/025; G10L 15/05;
(Continued)

(56) References Cited

U.S. PATENT DOCUMENTS 10,872,598 B2 * 12/2020 Arik ........................ G10L 13/08
11,232,780 B1 * 1/2022 Iyer ....................... G10L 13/027
(Continued)

FOREIGN PATENT DOCUMENTS

CN 112863476 B * 7/2024 ............ G10L 15/05
KR 10-1871604 B1 6/2018
(Continued)

OTHER PUBLICATIONS

Jia et al., "Transfer Learning from Speaker Verification to Multispeaker Text-To-Speech Synthesis", arXiv:1806.04558v4 [cs.CL], Jan. 2, 2019 (15 pages total).

(Continued)

*Primary Examiner* — Richemond Dorvil
(74) *Attorney, Agent, or Firm* — Sughrue Mion, PLLC

(57) ABSTRACT

According to an aspect, a method of synthesizing a multi-speaker speech using an artificial neural network, the method comprising generating a speech learning model for a plurality of users based on speech data of the plurality of users, generating a first speaker vector for speech data of a new speaker and a plurality of second speaker vectors for speech data of the plurality of users using a speaker recognition model, determining a third speaker vector having a highest correlation with the first speaker vector among the plurality of second speaker vectors based on a present criterion and predicting a new speaker vector of the new user based on the third speaker vector and the first speaker vector using an adversarial training method.

6 Claims, 9 Drawing Sheets

(58) Field of Classification Search
CPC ....... G10L 15/07; G10L 15/083; G10L 15/10; G10L 15/12; G10L 15/16; G10L 17/04; G10L 17/18; G10L 21/003; G10L 21/04; G10L 21/02; G06N 3/08
USPC ........................................................ 704/258
See application file for complete search history.

(56) References Cited

U.S. PATENT DOCUMENTS

| | | | | |
|---|---|---|---|---|
| 11,295,721 | B2 * | 4/2022 | Gururani | G06N 3/0495 |
| 11,302,329 | B1 * | 4/2022 | Sun | G10L 25/51 |
| 11,410,684 | B1 * | 8/2022 | Klimkov | G06F 16/38 |
| 11,605,388 | B1 * | 3/2023 | Gupta | A63F 13/424 |
| 11,790,884 | B1 * | 10/2023 | Shakeri | G10L 21/007 704/258 |
| 12,051,400 | B1 * | 7/2024 | Sima | G10L 25/18 |
| 12,087,275 | B2 * | 9/2024 | Stanton | G06N 3/08 |
| 12,260,851 | B2 * | 3/2025 | Finkelstein | G10L 13/033 |
| 12,296,265 | B1 * | 5/2025 | Gupta | G10L 19/04 |
| 12,340,788 | B2 * | 6/2025 | Gururani | G06N 3/045 |
| 2019/0019500 | A1 * | 1/2019 | Jang | G10L 15/063 |
| 2022/0246130 | A1 * | 8/2022 | Baughman | G10L 13/033 |
| 2022/0382999 | A1 * | 12/2022 | Gunasekara | G10L 15/142 |

FOREIGN PATENT DOCUMENTS

| | | | |
|---|---|---|---|
| KR | 10-2019-0008137 | A | 1/2019 |
| KR | 10-1988504 | B1 | 10/2019 |
| KR | 10-2020-0029314 | A | 3/2020 |

OTHER PUBLICATIONS

Baas et al., "StarGAN-ZSVC: Towards Zero-Shot Voice Conversion in Low-Resource Contexts", arXiv:2106.00043v1 [eess.AS], May 31, 2021 (16 pages total).

* cited by examiner

METHOD AND DEVICE FOR SYNTHESIZING MULTI-SPEAKER SPEECH USING ADVERSARIAL ARTIFICIAL NEURAL NETWORK

CROSS-REFERENCE TO RELATED APPLICATION

This application claims the benefit of Korean Patent Application No. 10-2021-0115121, filed on Aug. 30, 2021 in the Korean Intellectual Property Office, the disclosure of which is incorporated herein by reference.

FIELD OF THE DISCLOSURE

The present invention relates to a method and a device for synthesizing a multi-speaker speech using an artificial neural network, and more particularly, to a technology for, when generating a speech of a new speaker, quickly and accurately generating a speech learning model of the new speaker using some of a plurality of speech vectors of a plurality of speaks.

BACKGROUND

A speech is the most natural means of communication of humans and an information transfer means and is a meaningful sound, which is made by humans, as a means of realizing language.

As technology advances, research on realization of communication between humans and machines through a speech is continuing. Moreover, recently, as a field of speech information technology (SIT) for effectively processing speech information has been significantly developed, the SIT is being applied in real life.

Such an SIT may be mainly classified into categories such as speech recognition, speech synthesis, speaker identification and verification, and speech coding.

The speech recognition is a technology for recognizing an uttered speech and converts the recognized speech into a string, and the speech synthesis is a technology for converting a string into the original speech using data or parameters obtained from speech analysis. The speaker identification and verification is a technology for estimating or authenticating a speaker through an uttered speech, and the voice coding is a technology for effectively compressing and encoding a speech signal.

Among the technologies, describing a development process of a speech synthesis technology, due to the rapid development of computers, a computer-based speech synthesis method has become the mainstream of a speech synthesis method, and the speech synthesis technology may be mainly classified into two types according to an actual application method. Examples of the speech synthesis technology includes a limited vocabulary synthesis or automatic response system (ARS) which synthesizes only a sentence having a limited vocabulary and a syntactic structure and an unlimited vocabulary synthesis or text-to-speech (TTS) system which receives an arbitrary sentence and synthesizes a speech.

The quality of a synthesized speech generated according to a speech synthesis technology may be evaluated using two criteria of naturalness and sound quality. Here, the naturalness of the two criteria is greatly influenced by a first stage of three stages. The sound quality is greatly affected by an acoustic model and the performance of a vocoder. Since an acoustic model greatly influences sound quality, many new algorithms have been proposed.

In particular, with the development of artificial intelligence technology, artificial neural network-based algorithms show significant performance improvement compared with existing models. In general, a speech synthesis model using an artificial neural network may replace an acoustic model part with an artificial neural network, and the artificial neural network may synthesize speech parameters based on analyzed sentence data. Learning performed through deep learning without human intervention in a process of converting text into a speech is called end-to-end (E2E). Many E2E speech synthesis models (hereafter, speech synthesis models) that generate a speech from text through E2E learning have been proposed.

A multi-speaker speech synthesis model, which is one of speech synthesis models, refers to a speech synthesis model capable of generating voices of multiple persons in one model.

A multi-speaker speech synthesis model may be implemented by changing an acoustic model. First, an acoustic model for each speaker is constructed using speech data for each speaker, and a speech is synthesized for each speaker by changing an acoustic model. Since an acoustic model synthesizes a speech feature vector, it is possible to synthesize a speech feature vector for each speaker that reflects each speech characteristic through the replacement of an acoustic model.

However, the conventional multi-speaker speech synthesis model has an advantage in that it is possible to generate a speech using voices of multiple speakers but also has a disadvantage in that a lot of data is required to train multiple speakers. When a multi-speaker speech synthesis model is to be trained with desired voices of speakers, tens of minutes of speech data and text of a speech are needed for each speaker. Collecting such a large amount of data causes a lot of problems in time and money, and in particular, there have been many difficulties in various environments when the collecting is performed in individuals or small businesses.

SUMMARY OF THE DISCLOSURE

Technical Objects

Therefore, a method and a system for synthesizing a multi-speaker speech using an artificial neural network according to one embodiment are inventions designed to solve the above-described problems and are directed to more rapidly and accurately process speech data of a new speaker using previously learned data.

Specifically, the present invention is directed to synthesize a voice of a new user only with relatively less data by learning the voice of the new user based on a speech learning model of a user that has the most similar characteristics to the voice of the new user and at the same time is trained in advance According to an aspect, a method of synthesizing a multi-speaker speech using an artificial neural network, the method comprises generating a speech learning model for a plurality of users based on speech data of the plurality of users, generating a first speaker vector for speech data of a new speaker and a plurality of second speaker vectors for speech data of the plurality of users using a speaker recognition model, determining a third speaker vector having a highest correlation with the first speaker vector among the plurality of second speaker vectors based on a present criterion and predicting a new speaker vector of the new user based on the third speaker vector and the first speaker vector using an adversarial training method.

the predicting based on the preset criterion may use a feature vector extracted from the speech data of the new speaker.

the predicting based on the preset criterion may include calculating a cosine similarity value based on calculated inner product values and determining a speaker vector of a user, which has a greatest cosine similarity value among the plurality of users, to be the third speaker vector.

The predicting based on the preset criterion may include performing predicting based on a pronunciation duration time extracted from each of the speech data of the new speaker and speech data of a third speaker who is a speaker of the third speaker vector.

The adversarial training method may be performed adversarial comparison of the predicted new speaker vector using actual speech data of the new speaker, the feature vector, the third vector, and the cosine similarity value.

According to another aspect. a device for synthesizing a multi-speaker speech using an artificial neural network, the device may comprise a speech synthesizer which generates a speech learning model for a plurality of users based on speech data of the plurality of users, a speech vector generator which generates a first speaker vector for speech data of a new speaker and a plurality of second speaker vectors for speech data of the plurality of users using a speaker recognition model and a similar vector determiner which predicts a third speaker vector having a highest correlation with the first speaker vector among the plurality of second speaker vectors based on a preset criterion and the similarity vector determiner may predict a new speaker vector of the new user based on the third speaker vector and the first speaker vector using an adversarial training method.

The similar vector determiner may use a feature vector extracted from the speech data of the new speaker.

The similar vector determiner may calculate a cosine similarity value based on calculated inner product values and determines a speaker vector of a user, which has a greatest cosine similarity value among the plurality of users, to be the third speaker vector.

The similar vector determiner may perform predicting based on a pronunciation duration time extracted from each of the speech data of the new speaker and speech data of a third speaker who is a speaker of the third speaker vector.

The similar vector determiner may perform an adversarial comparison between the predicted new speaker vector and actual speech data of the new speaker using the feature vector, the third speaker vector, and the cosine similarity value.

According to other aspect, a device for synthesizing a multi-speaker speech using an artificial neural network, the device may comprise a speech synthesizer which generates a speech learning model for a plurality of users based on speech data of the plurality of users, a speech vector generator which generates a first speaker vector for speech data of a new speaker and a plurality of second speaker vectors for speech data of the plurality of users using a speaker recognition model and a similar vector determiner which predicts a third speaker vector having a highest correlation with the first speaker vector among the plurality of second speaker vectors based on a preset criterion and the similarity vector determiner may predict a new speaker vector of the new user based on the third speaker vector and the first speaker vector using an adversarial training method.

The similar vector determiner may use a feature vector extracted from the speech data of the new speaker.

The similar vector determiner may calculate a cosine similarity value based on calculated inner product values and determines a speaker vector of a user, which has a greatest cosine similarity value among the plurality of users, to be the third speaker vector.

The similar vector determiner may perform predicting based on a pronunciation duration time extracted from each of the speech data of the new speaker and speech data of a third speaker who is a speaker of the third speaker vector.

The similar vector determiner may perform an adversarial comparison between the predicted new speaker vector and actual speech data of the new speaker using the feature vector, the third speaker vector, and the cosine similarity value.

Effects of the Invention

A method and a system for synthesizing a multi-speaker speech using an artificial neural network according to one embodiment are inventions designed to solve the above-described problems and are directed to more rapidly and accurately process speech data of a new speaker using previously learned data.

Specifically, the present invention is directed to synthesize a voice of a new user only with relative less data by learning the voice of the new user based on a speech learning model of a user that has the most similar characteristics to the voice of the new user and at the same time is trained in advance.

DETAILED DESCRIPTION OF THE PREFERRED EMBODIMENTS

Figure 1:
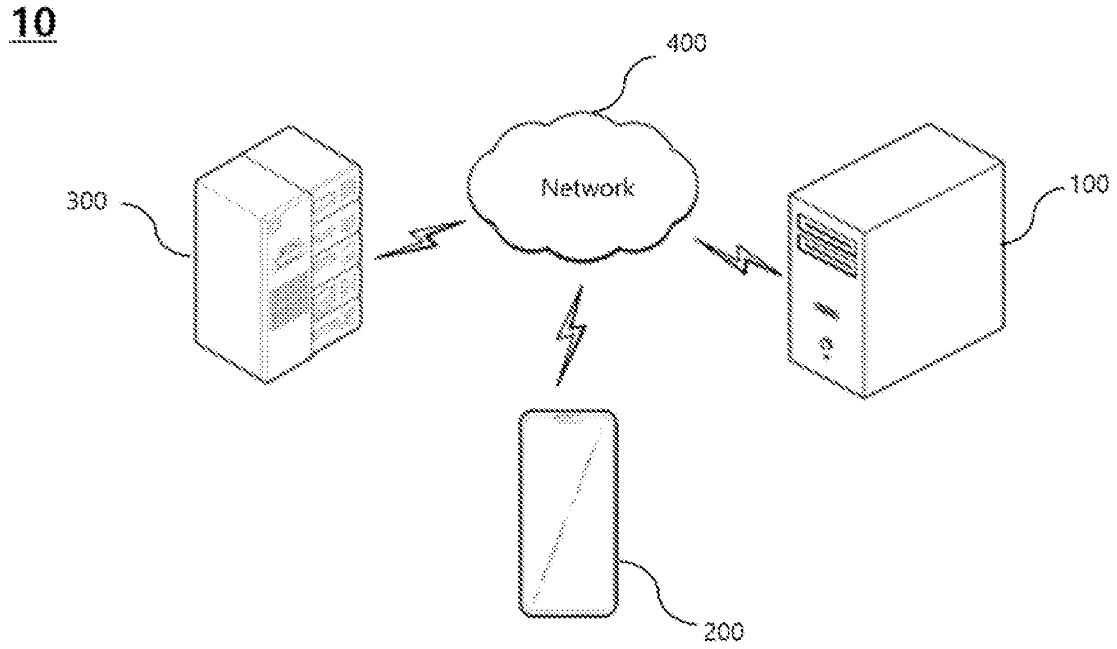
FIG. 1 is a block diagram illustrating some components of a system for synthesizing a multi-speaker speech using an artificial neural network according to one embodiment.

Hereinafter, embodiments according to the present invention will be described with reference to the accompanying drawings. In adding reference numerals to constituent elements of each drawing, it should be noted that the same constituent elements are denoted by the same reference numeral even if they are illustrated on different drawings. In describing the embodiments of the present invention, a detailed description of pertinent known constructions or functions will be omitted if it is deemed to make the gist of the embodiments the present invention unnecessarily vague. In addition, the embodiments of the present invention will be described below, but the technical idea of the present invention is not limited thereto or is not restricted thereto, and may be variously realized by being modified by those skilled in the art.

In addition, terms used in the present specification are used only in order to describe embodiments rather than limiting or restricting the present invention. Singular forms are intended to include plural forms unless the context clearly indicates otherwise.

In the present specification, it should be understood that the term "include", "comprise", or "have" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

In addition, throughout the specification, when it is described that an element is "connected" to another element, this includes not only being "directly connected", but also being "indirectly connected" with another element in between, and terms including ordinal numbers such as first, second, and the like used in the present specification will be used only to describe various elements, and are not to be interpreted as limiting these elements.

The present invention will be described more fully hereinafter with reference to the accompanying drawings, in which embodiments of the invention are shown. In the drawings, parts irrelevant to the description are omitted in order to clearly describe the present invention.

Furthermore, the title of the invention is a method and apparatus for providing a document editing interface for providing resource information related to a document using a backlink button. For convenience of explanation, however, in the specification below, an apparatus for providing a document editing interface for providing resource information associated with a document using a backlink button is referred to as a document editing interface providing apparatus in its description. The meaning of 'clicking' throughout the document is used to refer to the user requesting an execution command for the button, and as a common term, it may refer to executing a command by clicking a mouse or using a specific key on a keyboard in a PC environment, and tapping by a user's touch consecutively or for a certain period of time in a mobile environment.

Hereinafter, embodiments in accordance with the present disclosure will be described in detail with reference to the accompanying drawings, and although the title of the present disclosure is 'Data Inversion Circuit Using PAM 4 Signal', it will be referred to as 'a data inversion circuit' for the convenience of the description below.

FIG. 1 is a block diagram illustrating some components of a system 10 for synthesizing a multi-speaker speech using an artificial neural network according to one embodiment.

As shown in FIG. 1, in the system 10 for synthesizing a multi-speaker speech using an artificial neural network, a device 100 for synthesizing a multi-speaker speech, a user terminal 200, and a server 300 may be communicatively connected to each other through a network 400. The device 100 for synthesizing a multi-speaker speech, the user terminal 200, and the server 300 may be connected to each other in a 5G communication environment.

Furthermore, in addition to the devices shown in FIG. 1, various electronic devices used at home or in an office may operate by being connected to each other in an Internet of Things environment. Hereinafter, for convenience of description, the system 10 for synthesizing a multi-speaker speech using an artificial neural network will also be referred to as a speech synthesis device 100.

The speech synthesis device 100 may be a device for generating and outputting input target text as a voice of a specific user and may be provided with a device for outputting a speech as well as devices required for performing various artificial intelligence algorithms, and may store data required for operating an artificial neural network.

The speech synthesis device 100 may be a device capable of performing learning and inferring and outputting a synthesized speech of a user through an artificial neural network module, may be implemented using a device such as a server, a personal computer (PC), a tablet PC, a smartphone, a smart watch, a smart glass, a wearable device, or the like, and may also be implemented with a specific application or program.

After accessing a speech synthesis application or a voice synthesis site, through an authentication process, the user terminal 200 may monitor status information of the speech synthesis device 100 or may receive a service capable of driving or controlling the device 100 for synthesizing a multi-speaker speech.

In the present embodiment, the user terminal 200 that has completed the authentication process may select, for example, text for synthesizing a speech and a speech learning model for generating a speech and may receive a speech result output by the speech synthesis device 100 through the selected target text and speech learning model.

The user terminal 200 may include a desktop computer, a smartphone, a notebook computer, a tablet PC, a smart television (TV), a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices, which are operated by a user, but the present invention is not limited thereto. Furthermore, the user terminal 200 may be a wearable terminal having a communication function and a data processing function, such as a watch, glasses, a hairband, or a ring. The user terminal 200 is not limited to the above-described contents, and a terminal which is capable of web-browsing may be adapted without limitation.

The server 300 may be a database server which provides big data required to apply various artificial intelligence algorithms and data for operating the speech synthesis device 100. In addition, the server 300 may include a web server or an application server which enables the speech synthesis device 100 to be remotely controlled using a speech synthesis application or a web browser installed in the user terminal 200.

Here, artificial intelligence (AI) is a field of computer engineering and information technology for researching a method of enabling a computer to do thinking, learning and self-development that can be done by human intelligence, and means that a computer can imitate a human intelligent action.

In addition, artificial intelligence does not exist in itself but has many direct and indirect associations with the other fields of computer science. In particular, today, attempts to introduce artificial intelligent elements to various fields of information technology to deal with issues of the fields have been actively made.

Machine learning is a field of artificial intelligence which includes a field of research that gives a computer a capability to learn without being explicitly programmed.

Specifically, machine learning is a technology for researching and building a system for learning, making a prediction, and enhancing its own performance based on experiential data, and an algorithm for such a system. Machine learning algorithms, rather than executing rigidly set static program commands, may take an approach that builds models for deriving predictions or decisions based on input data.

In addition, the server 300 may transmit or receive signals to or from the artificial speech synthesis device 100 and/or the user terminal 200.

The server 300 may receive text, which is to be converted into a speech and is received from the user terminal 200, and information about a selected speech synthesis model, and then transmit the received information to the speech synthesis device 100.

The server 300 may generate a speech using an artificial neural network based on text and a speech synthesis model selected by the user terminal 200 and may transmit information about the generated speech to the speech synthesis device 100.

Alternatively, the server 300 may selectively transmit only necessary data to the speech synthesis device 100 such that the device 100 for synthesizing a multi-speaker speech may synthesize a speech. That is, a user speech synthesis and artificial intelligence process may be performed by the server 300 or may be performed by the speech synthesis device 100.

The network 400 may serve to connect the device 100 for synthesizing a multi-speaker speech using an artificial neural network, the user terminal 200, and the server 300. The network 400 may include, for example, wired networks such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present invention is not limited thereto. In addition, the network 400 may transmit or receive information using short-distance communication and/or long-distance communication. The short-distance communication may include Bluetooth, radio frequency identification (RFID), infrared data association (IrDA), ultra-wideband (UWB), ZigBee, and Wi-Fi (wireless fidelity) technologies, and the long-distance communication may include code division multiple access (CDMA), frequency division multiple access (FDMA), time division multiple access (TDMA), orthogonal frequency division multiple access (OFDMA), and single carrier frequency division multiple access (SC-FDMA) technologies.

The network 400 may include connections of network elements such as hubs, bridges, routers, switches, and gateways. The network 400 may include one or more connected networks, including a public network such as the Internet and a private network such as a secure corporate private network. For example, the network 400 may include a multi-network environment. Access to the network 400 may be provided through one or more wired or wireless access networks. Furthermore, the network 400 may support 5G communication and/or an Internet of things (IoT) network for exchanging and processing information between distributed components such as objects.

Figure 2:
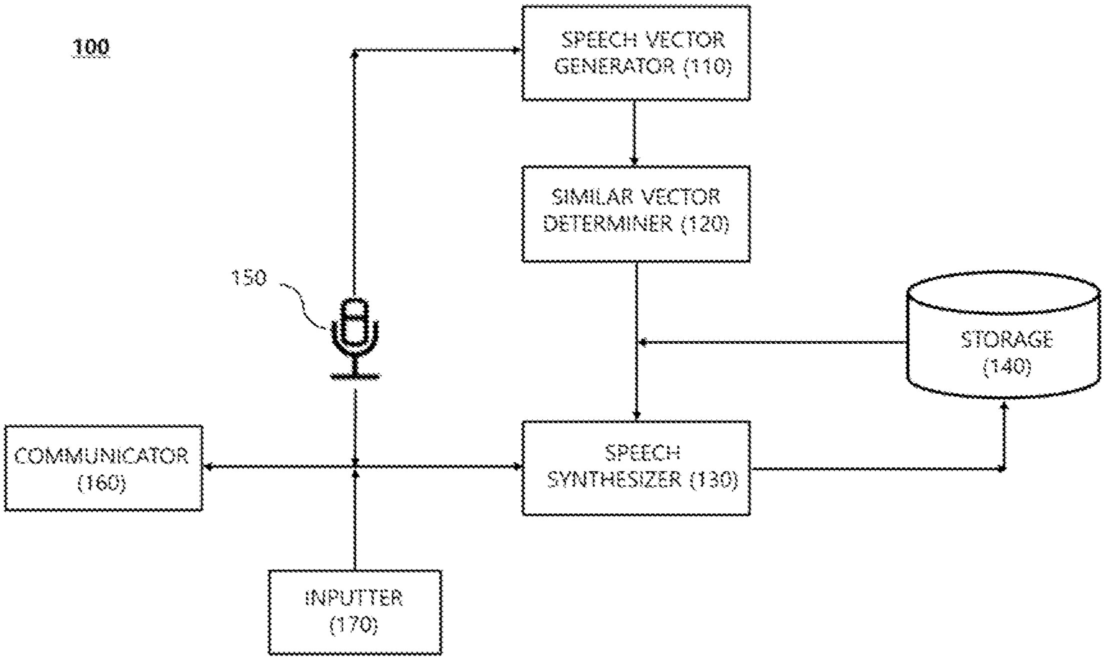
FIG. 2 is a block diagram illustrating some components of a device for synthesizing a multi-speaker speech using an artificial neural network according to one embodiment.

FIG. 2 is a block diagram illustrating some components of a device for synthesizing a multi-speaker speech using an artificial neural network according to one embodiment.

Referring to FIG. 2, a speech synthesis device 100 may include a speaker vector generator 110, a similar vector determiner 120, a speech synthesizer 130, a storage 140, a microphone 150, a communicator 160, an inputter 170, and the like.

The communicator 160 may receive various commands for speech synthesis while communicating with a user terminal 200 and a server 300 and may receive various types of information required for speech synthesis from the server 300.

Therefore, the communicator 160 may perform wireless communication according to a long-term evolution (LTE), LTE-Advance (LTE-A), CDMA, wideband CDMA (WCDMA), wireless broadband (WiBro), Wi-Fi, Bluetooth, near field communication (NFC), global positioning system (GPS), or global navigation satellite system (GNSS) method. For example, the communicator 160 may perform wired communication according to a universal serial bus (USB), high definition multimedia interface (HDMI), recommended standard-232 (RS-232), or plain old telephone service (POTS) method.

The speech synthesizer 130 may synthesize text input from the inputter 170 into a speech. Specifically, when text is input, through a process of performing language interpretation on the inputted text and synthesizing the text into a speech, the speech synthesizer 130 may convert the text into a naturally synthesized speech and output the naturally synthesized speech. Such a process may be performed through text-to-voice (TTS).

Accordingly, the speech synthesizer 130 converts text to be verified into a preprocessing speech through three operations of language processing, prosody generating, and waveform synthesizing operations. A grammatical structure of text to be verified may be analyzed (language processing operation), a prosody as read by a person may be generated using the analyzed grammatical structure, and basic units according to the generated prosody may be collected to generate a synthesized speech.

Speech synthesis is the name of a technology for converting text into a speech. A speech for an input sentence may be generated using a speech synthesis technology. The earliest speech synthesis technology is called as concatenative speech synthesis. The concatenative speech synthesis is a method in which, after sounds of respective phonemes of a person are recorded, the recorded sounds are connected to generate a speech for a sentence.

However, since a person utters a speech with a different rhyme according to a voice, the method cannot generate a speech that is as natural as an actual speech uttered by a person. A second speech synthesis technology is parametric speech synthesis. Such a method is a method of forming waves by combining various features such as a feature of each phoneme, a feature of a basic frequency, and spectrogram.

In such a method, since various features are used to form waves through human intervention, an unnatural speech is generated. Afterwards, based on such technologies, an end-to-end speech synthesis system using deep learning has been introduced.

Tacotron is an end-to-end speech synthesis system made by Google. End-to-end is a structure formed of only deep learning without human intervention from beginning to end. Four main modules are present in Tacotron. That is, an encoder, an attention, a decoder, and a vocoder are present. The encoder is a module that extracts a feature of each phoneme from text.

The decoder is a module that generates mel spectrogram. The attention compares the mel spectrogram with feature sequences of respective phonemes output from the encoder and maps each phoneme on the mel spectrogram.

For example, in the text "HELLO," mel spectrogram for a sound corresponding to "H" is found in mel spectrogram, and among "H," "E," "L," "L," and "O," "H," is weighted to generate a sound for "H" when the decoder generates the mel spectrogram.

The vocoder converts the generated mel spectrogram into an audio waveform. In Tacotron, waves are generated using the Griffin-Lim algorithm (Daniel W. Griffin 1984). Tacotron is an end-to-end speech synthesis model designed as described above.

After that, the performance of Tacotron has been further raised to design Tacotron 2. Tacotron 2 is a high-performance speech synthesis model which synthesizes a speech that is difficult to distinguish from an actual speech of person. Tacotron 1 and Tacotron 2 are single speaker speech synthesis models. A single speaker speech synthesis model may synthesize a speech with only one person's voice. Hereinafter, a method of synthesizing a multi-speaker speech will be described in detail.

In recent years, there has been a lot of research on multi-speaker speech synthesis models. In the multi-speaker speech synthesis model, by using one speech synthesis model, a speech may be synthesized with voices of multiple speakers. The overall structure of the multi-speaker speech synthesis model includes an encoder, an attention, a decoder, and a vocoder like Tacotron. In such a structure, voices of multiple persons may be expressed using a speaker vector. In the present invention, a speaker vector is a vector expressing each speaker and is referred to as an embedding. When a speech is synthesized, the speaker vector is conditioned on a speech synthesis model.

In a case in which a speech is synthesized, when a speaker vector corresponding to each speaker is input, a speech is synthesized with a voice of the speaker. A representative multi-speaker speech synthesis model is Deep Voice 2 (2017). Deep Voice 2 may synthesize voices of multiple speakers. A speaker vector used in Deep Voice 2 is learnable data.

Therefore, after a speaker vector is randomly initialized, when a speech synthesis model and a speaker vector are trained using multi-speaker learning data, a speaker vector of each speaker obtains a value suitable to be expressed as a voice of a corresponding speaker. Instead of using such a trainable speaker vector, a speaker vector having a fixed value may be used. In general, when a multi-speaker speech synthesis model is implemented, in a case in which a trainable speaker vector is used, better performance is exhibited compared with a case in which a fixed value is used.

However, such a method is effective when adapting to a new speaker, but a fine-tuning process is necessarily required, resulting in time/computational loss. Accordingly, the present invention is an invention devised to solve the problems, and an object of the present invention is to effectively provide a speech synthesis model with less data. Hereinafter, embodiments of the present invention will be described in detail.

Figure 3:
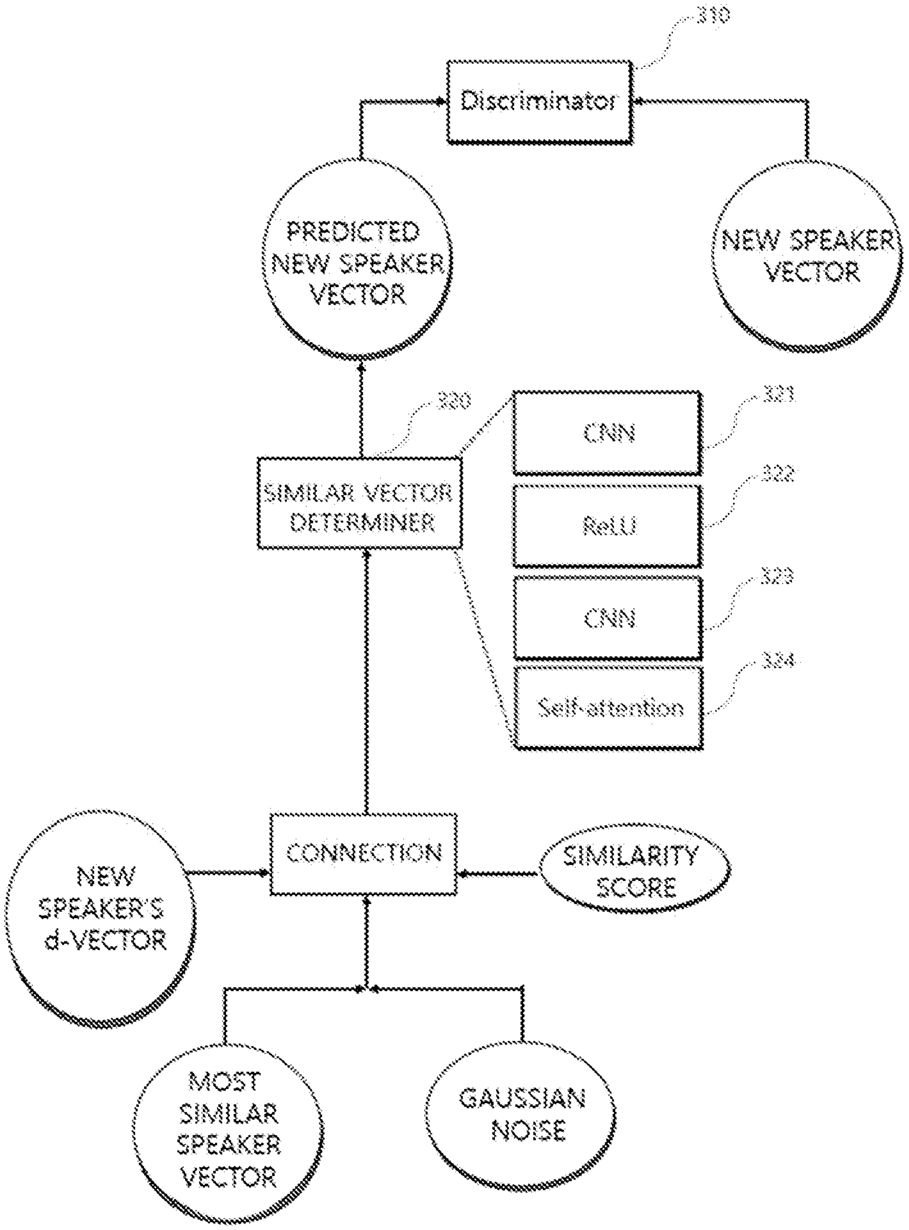
FIG. 3 is a conceptual diagram illustrating a process of predicting a speaker vector according to the present invention.
Figure 4:
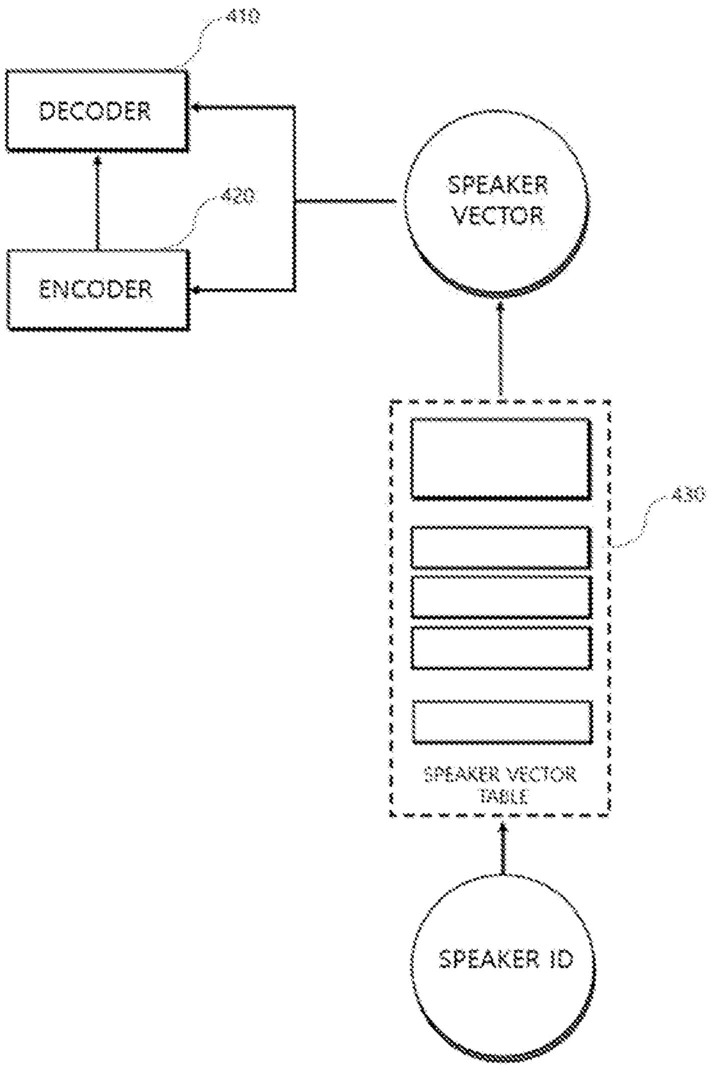
FIGS. 4 to 6 illustrate a speaker vector table according to embodiments of the present invention.
Figure 5:
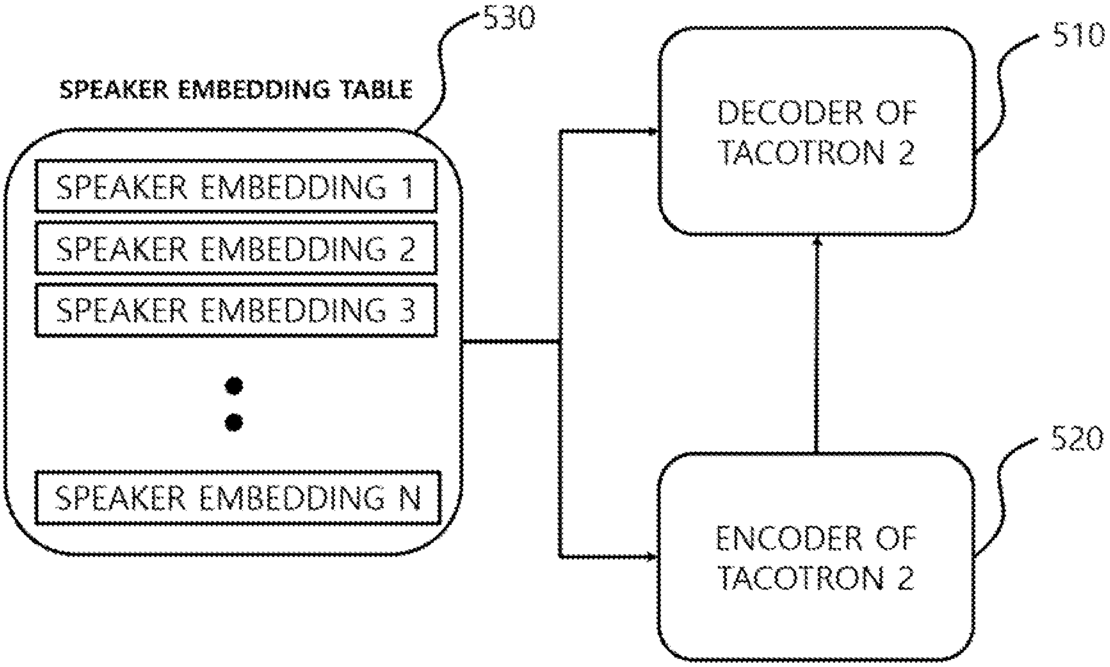
Figure 6:
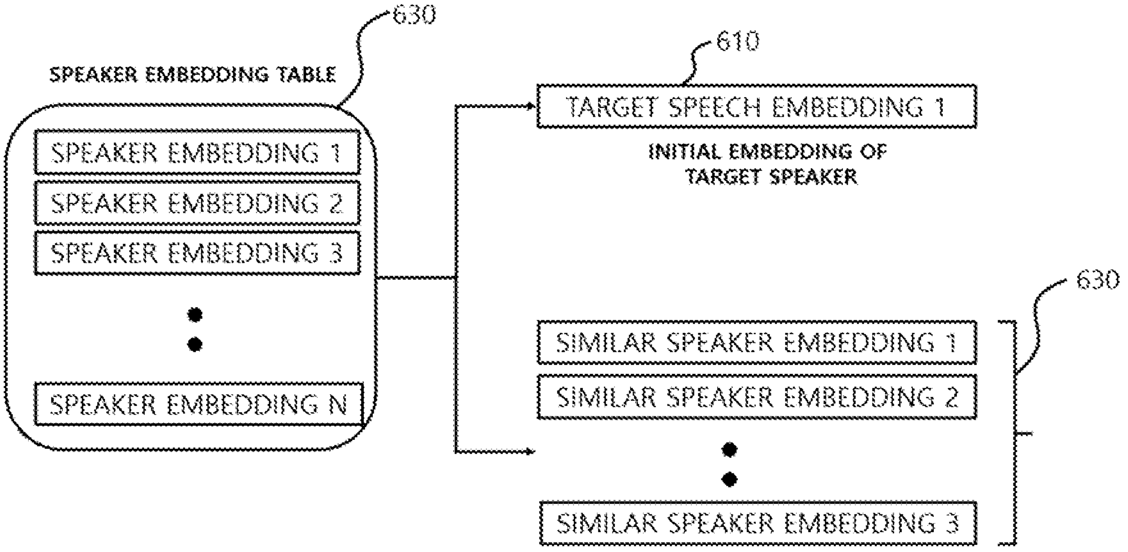

FIG. 3 is a conceptual diagram illustrating a process of predicting a speaker vector according to the present invention. FIGS. 4 to 6 illustrate a speaker vector table according to embodiments of the present invention.

Referring to FIG. 3, FIG. 3 illustrates an overall structure of an initial embedding predictor to which an adversarial training method is applied. A d-vector of a new speaker, speaker vectors of similar speakers, and a similarity score are input, and Gaussian noise is added to the speaker vectors of the similar speakers. In this case, a distribution of Gaussian noise has an average of 0 and a standard deviation of 0.1.

In the present invention, a high-performance single-speaker speech synthesis model may be used, and Tacotron2 may be used representatively. A processor of the present invention (for example, the components 110, 120, and 130 of FIG. 2) may implement a multi-speaker speech synthesis model by adding a speaker vector table to Tacotron2. A speaker vector table 430, 530, or 630 is a virtual table in which speaker vectors of multiple speakers are stored and to which a speaker ID is input as an input.

In FIG. 4, the speaker vector table, and an encoder and a decoder of Tacotron2 are shown. According to a speaker ID input to the speaker vector table, a speaker vector corresponding thereto is extracted, which becomes a recurrent neural network (RNN) initial state of the encoder and decoder. In this way, multi-speaker training is performed, and a trained-speaker vector table becomes a training dataset of the initial embedding predictor.

During training, after one speaker is designated in the speaker vector table, speaker vectors of speakers similar to an uttering speaker, a similarity score, and a speaker's d-vector are input as input information.

Table 1 shows a comparison between the performances of an initial speaker vector prediction and other initialization methods. Table 1 shows a calculation of 11-distance with a new speaker. As can be seen in Table 1, the performance of random initialization according to a related art is the lowest, and the initial speaker vector prediction of the present invention has an average of 0 and a standard deviation of 0.1 and predicts a speaker vector closest to that of a new speaker.

TABLE 1

| Initialization method | /1-distance/$d_e$ |
|---|---|
| Uniform distribution (−0.1, 0.1) | 0.3112 |
| Gaussian distribution ($\mu = 0$, $\sigma = 1$) | 0.8058 |
| Similar speaker embedding (w/o P.D.) | 0.1323 |
| Similar speaker embedding (w/P.D.) | 0.1247 |
| Initial embedding predictor (w/o A.T.) | 0.0212 |
| Initial embedding predictor (w/o G.N.) | 0.0227 |
| Initial embedding predictor ($\sigma = 1$) | 0.0180 |
| Initial embedding predictor ($\sigma = 0.1$) | 0.0171 |

A speaker ID is a number assigned to each speaker and generally starts from 0. When the processor inputs the speaker ID to the speaker vector table, a speaker vector of a speaker corresponding to the speaker ID is output, and the output speaker vector is trained together with a speech synthesis model.

Meanwhile, it is also important to input such a speaker vector to any position in the speech synthesis model. Here, in the case of a speech synthesis model including an RNN, the processor generally inputs the speaker vector as an initial state of the RNN. The RNN is a neural network that uses a previous output value as a current input value.

The RNN performs a calculation using Equations 1 and 2 below.

$$h_t = \tan h(W_{hh}h_{t-1} + W_{xh}x_t + b_n) \quad \text{[Equation 1]}$$

$$y_T = W_{hy}h_t + b_y \quad \text{[Equation 2]}$$

W and b denote training parameters, h denotes a state, and x denotes an input value of the RNN. The processor receives a state of a previous time step, forms a state of a current time step, and calculates an output value from the formed state. The above-described state affects the entire time step of the RNN and has a different value for each time step. Therefore, when a speaker vector is input as an initial state, the speaker vector can effectively affect the overall output value of the RNN.

Accordingly, the processor inputs a speaker vector output from the speaker vector table as an initial state of an RNN of an encoder 420 or 520 and a decoder 410 or 510 of Tacotron 2 to constitute a multi-speaker speech synthesis model. For multi-speaker training, a dataset including multiple speakers is used.

Hereinafter, a method of predicting an initial speaker vector will be described.

The present invention provides a method of generating a speaker vector which is capable of expressing a new speaker without a fine-tuning process.

First, a processor trains a multi-speaker speech synthesis model with massive multi-speaker data. Two open source datasets of VCTK and LibriSpeech are used as training data. The processor selects 700 speakers from two datasets and trains the speakers.

In the present invention, the processor can obtain 700 speaker vectors. The processor may train an initial embedding predictor using the obtained speaker vectors. The present invention provides an initial embedding predictor, which may be included in the processor, may also be included in a similar vector determiner 320 of FIG. 3, and may predict a speaker vector of a new speaker. The initial embedding predictor includes self-attention 324, convolutional neural networks (CNNs) 321 and 323, and a rectified linear unit (ReLU) 322.

The similarity vector determiner (or the initial embedding predictor) receives three types of inputs.

One of the received three types of inputs is a d-vector extracted from a speech to be predicted of a new uttering speaker. Here, the d-vector is a type of speaker feature vector extracted from a speaker verification model.

Others of the received three types of inputs are speaker vectors of speakers similar of the new speaker. In this case, in order to create a criterion for evaluating similarity, the similar vector determiner obtains a similarity score using Equation 3 below.

$$O_n = S_n - \alpha|1 - R_n| \quad \text{[Equation 3]}$$

Here, $O_n$ denotes a similarity score, and $S_n$ denotes cosine similarity calculated using a d-vector between two speakers. The cosine similarity represents tone similarity between two speakers and has a value range of 0 to 1. $\alpha$ is a constant and is 0.04. $R_n$ denotes a phoneme duration ratio between two speakers.

A phoneme duration refers to a duration time of one pronunciation, and a phoneme duration ratio between two speakers is calculated therefrom. As the phoneme duration ratio gets closer to 1, it means that phoneme durations of the two speakers are similar.

In conclusion, the similar vector determiner selects a certain number of speakers (for example, five people) who are similar to an uttering speaker through a similarity score. The similar vector determiner uses the trained speaker vectors of the selected speakers as inputs of the initial embedding predictor. Here, the similarity score calculated in a selection process becomes an input of a learning module later.

Such a process is summarized as follows.

First, multi-speaker speech synthesis training is performed using a mass multi-speaker dataset to generate speaker vectors of respective speakers. Second, in order to find a speaker similar to an uttering speaker, a similarity score with trained speakers is calculated. Third, five speakers with a high similarity score are selected to obtain speaker vectors thereof and a similarity score. Fourth, an uttering speaker's d-vector, the speaker vectors of the similar speakers, and the similarity score become inputs of the initial embedding predictor.

The similar vector determiner obtains the inputs of the initial embedding predictor through such four processes. Here, an adversarial training method may be applied.

A typical research field to which an adversarial training method is applied is a generative adversarial network (GAN). The GAN includes a generator and a discriminator (or a learning module) 310. The learning module (discriminator) is used for the purpose of distinguishing actual data from data generated by the generator. The discriminator outputs 1 when the actual data is input and outputs 0 when the actual data is not input. Here, the generator is directed to generate data with high quality which is difficult to distinguish from the actual data. That is, the discriminator is trained to not discriminate the data generated by the generator from the actual data.

As such, the adversarial training method is to increase the performance of the generator by training two networks having an adversarial relationship. In order to apply the adversarial training method to an initial speaker vector prediction of the present invention, in the present invention, the initial embedding predictor may be used as a generator, and a discriminator may be added.

The above-described discriminator may set a speaker vector of an actual new speaker to 1 and may set a speaker vector predicted by the initial embedding predictor to 0. A loss equation for discriminator training is as shown in Equation 4 below.

$$L_D = -\log(D(x)) - \log(1 - D(G(I,z))) \quad \text{[Equation 4]}$$

Here, D denotes a discriminator, G denotes a generator (initial embedding predictor), and x denotes actual data (actual speaker vector of an uttering speaker). Also, I denotes three types of inputs of the initial embedding predictor (new speaker's d-vector, speaker vectors of speakers similar to a new speaker, and a similarity score). z is Gaussian noise, and in the present invention, the best performance is shown when the Gaussian distribution has an average of 0 and a standard deviation of 0.1.

A loss equation of the initial embedding predictor is as shown in Equation 5 below.

$$L_I = -0.1 * \log(D(G(l,z))) + L_r \quad \text{[Equation 5]}$$

Here, is reconstruction loss and a mean squared error between an actual speaker vector of a new speaker and a speaker vector predicted by the initial embedding predictor. Through such a loss function, the performance of the initial embedding predictor can be improved.

The initial embedding predictor can be trained in this way to predict a speaker vector of a speaker, and a speaker vector of a new speaker can be predicted through subsequent training. Therefore, a speaker vector of a new speaker can be directly generated without fine-tuning.

Referring to FIG. 5, the similar vector determiner of the present invention obtains a speaker vector of each speaker through multi-speaker training. The speaker vectors are composed of values that can represent a voice of each speaker. That is, each speaker vector includes information of each speaker.

Referring to FIG. 6, among trained speaker vectors, m speaker vectors of a speaker most similar to a new speaker may be selected and used as an input for predicting an initial speaker vector.

Figure 7:
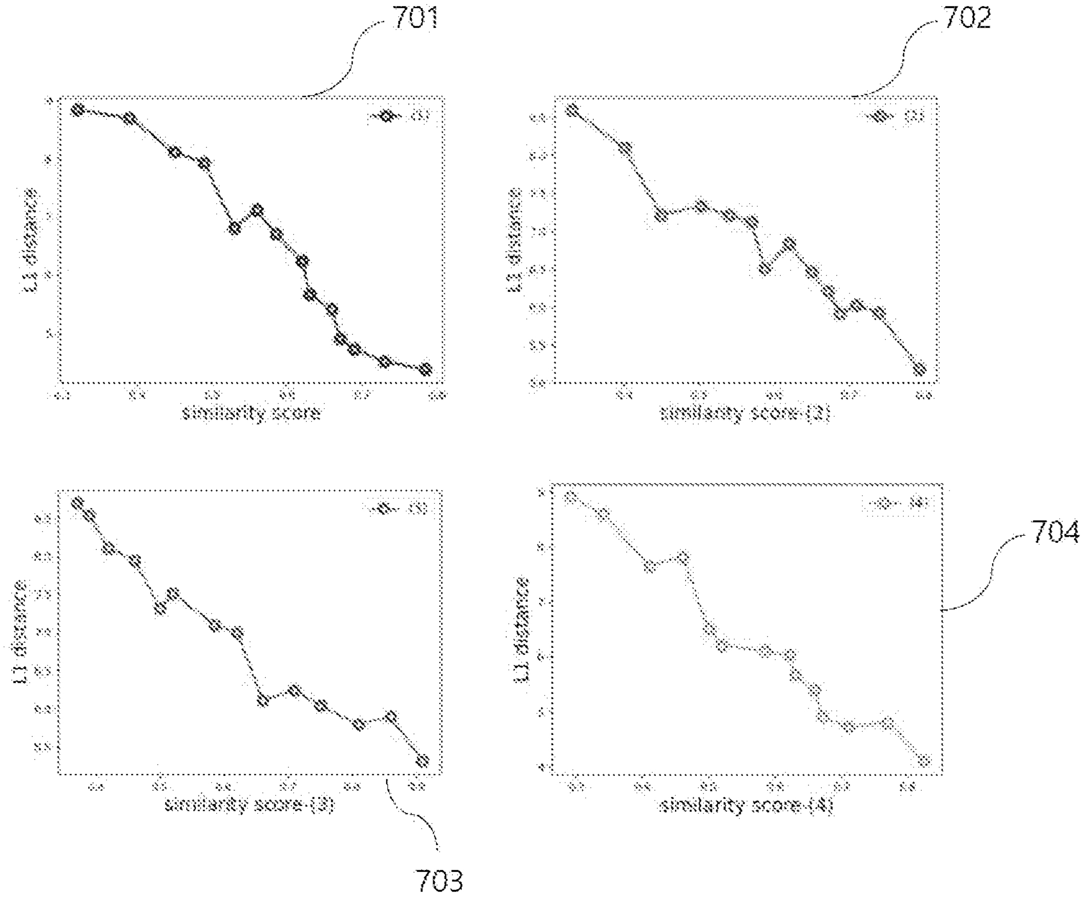
FIG. 7 shows graphs showing results of testing a method according to a similarity score according to an embodiment of the present invention.

FIG. 7 shows graphs showing results of testing a method according to a similarity score according to an embodiment of the present invention.

First, a similarity score between two speakers and a 11-distance between speaker vectors of two speakers according to the calculated similarity score are calculated. Here, as the similarity score increases, the 11-distance decreases, and as a decreased deviation increases, a method is a better scoring method. FIG. 7 shows results of measuring a 11-distance between two speakers for four similarity scores.

First, similarity score-(1) corresponds to a graph of a first result according to a first method in consideration of voice similarity and utterance speed. The graph of the first result was derived using Equation 6 below.

$$O_n=S_n+0.04|1-R_n| \quad \text{[Equation 6]}$$

Here, denotes cosine similarity of a d-vector, and denotes a ratio of utterance speeds of two speakers.

Similarity score-(2) corresponds to a graph of a second result according to a second method in consideration of only voice similarity. The graph of the second result was derived using Equation 7 below.

$$O_n=S_n \quad \text{[Equation 7]}$$

Next, similarity score-(3) is a graph of a third result graph according to a third method in consideration of only a speaker fundamental frequency (F0). For example, when a speaker utters a speech, a plurality of frequencies resonates to exhibit a tone of each speaker. In this case, F0 means a frequency with the smallest magnitude among the resonant frequencies. Equation 8 below is used for a criterion for comparing similarities of F0 between two speakers.

$$O_n = 1 - \log\left(\frac{\max(F_0^1, F_0^2)}{\min(F_0^1, F_0^2)}\right) \quad \text{[Equation 8]}$$

Here, the two F0s denote F0 values for two speakers, respectively, and thus smaller F0 of the two F0s is used as a denominator such that a log value is not negative. Equation 8 above generally has a value between 0.3 and 0.9.

Similarity-score-(4) is a graph of a fourth result according to a fourth method using both Equations 6 and 8 above. That is, voice similarity, utterance speed, and F0 are all considered. The graph of the fourth result was derived using Equation 9 below.

$$O_n=S_n-0.04|1-R_n|+0.15F_n \quad \text{[Equation 9]}$$

In Equation 9 above, all of constants are set to values showing the best performance through experiments. denotes Equation 8.

Among the four similarity scores, similarity-score-(4) shows the best performance for the 11-distance of two speakers.

Figure 8:
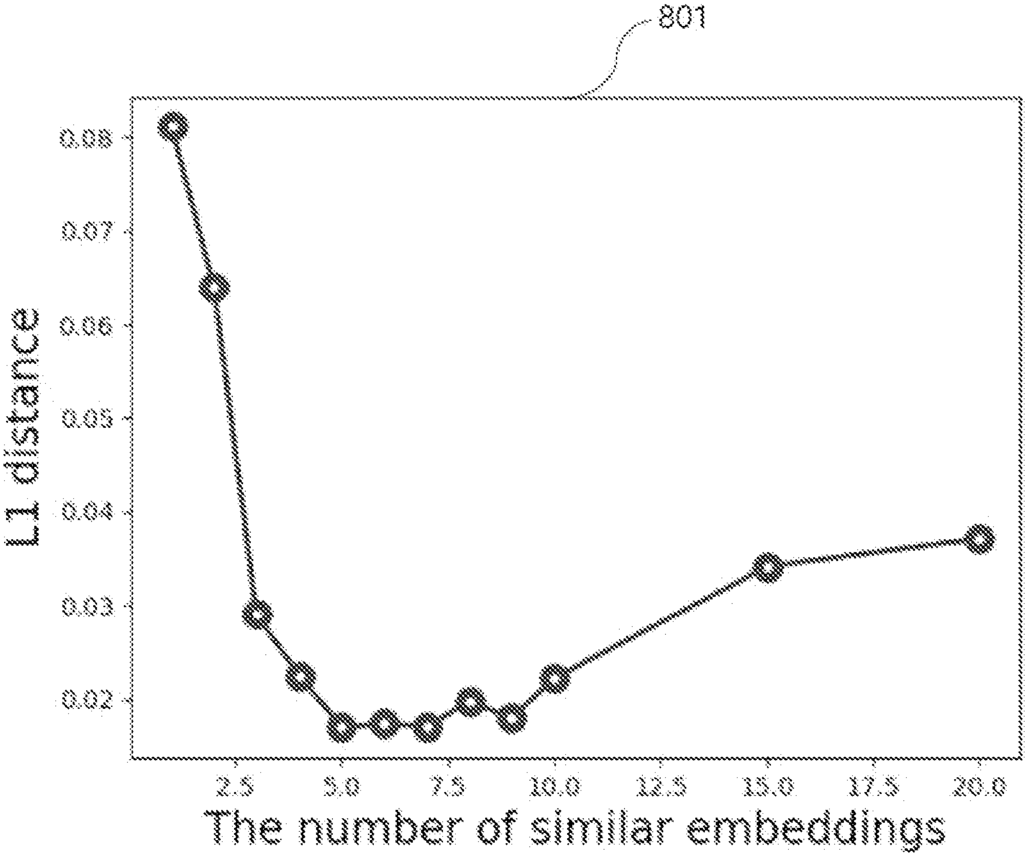
FIG. 8 is a graph showing a performance comparison according to the number of inputs of initial speaker vector prediction.

FIG. 8 is a graph showing a performance comparison according to the number of inputs of initial speaker vector prediction.

Referring to FIG. 8, in the initial speaker vector prediction, m speaker vectors of speakers similar to a new speaker are input. In this case, a performance difference of the initial embedding predictor was measured according to a value of m.

As can be seen in FIG. 8, when five similar speaker vectors are input, the best performance is exhibited. Through scoring, similar speaker vectors are obtained in order from high similarity to low similarity. In this case, when too many embedding are selected, similar embedding with a low correlation with a speaker vector of an uttering speaker are input together as inputs, which hinders the training of a deep neural network (DNN) model.

On the other hand, when the number of embedding is too small, an amount of information input to predict a speaker vector of a speaker is small, which makes it difficult to predict the speaker vector.

In conclusion, 5 is the most appropriate value for m. A y-axis shows a 11-distance between an actual embedding of an uttering speaker and a predicted embedding in a validation set.

Figure 9:
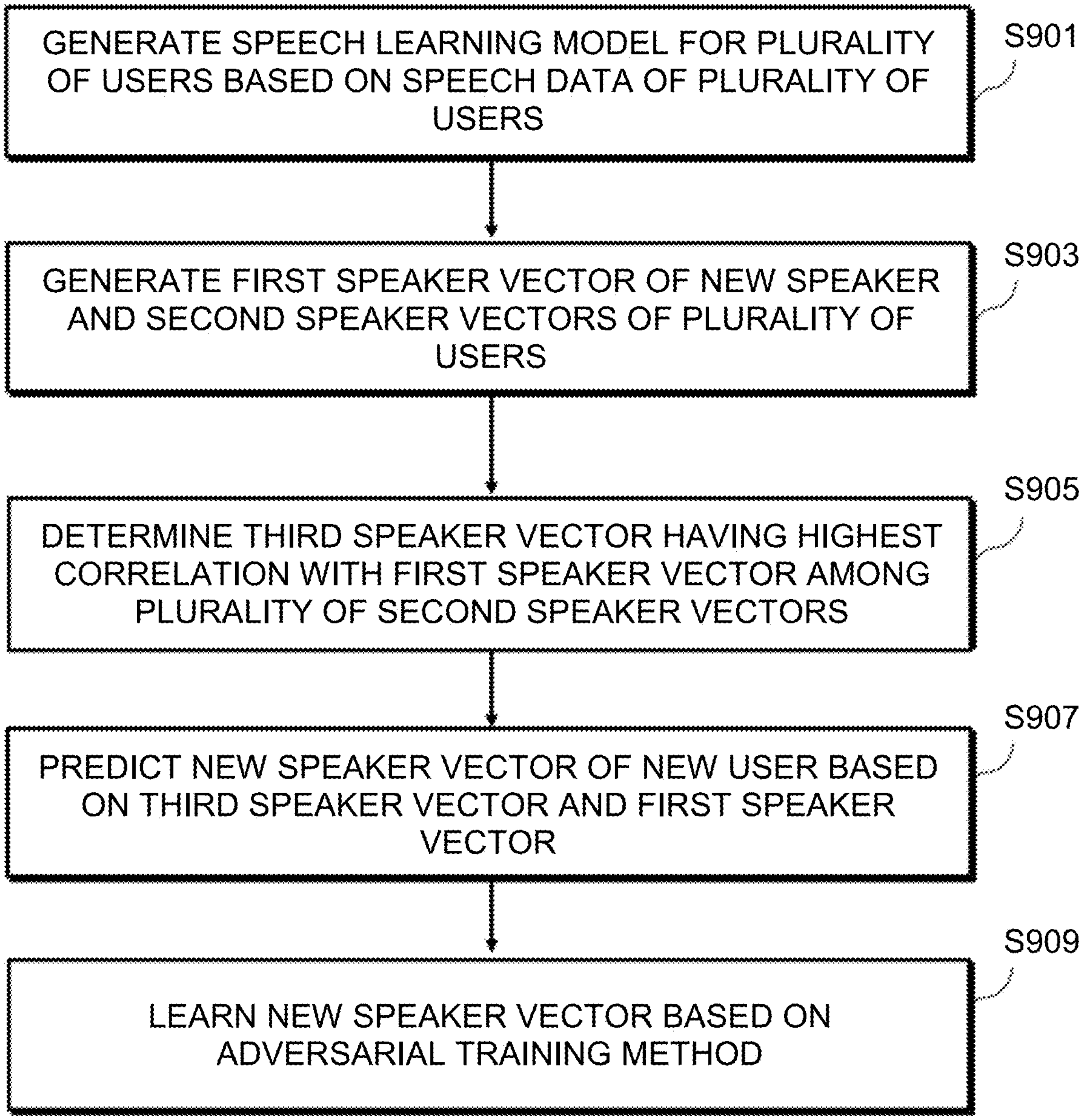
FIG. 9 is a flowchart illustrating a method of synthesizing a multi-speaker speech using an artificial neural network according to an embodiment of the present invention.

FIG. 9 is a flowchart illustrating a method of synthesizing a multi-speaker speech using an artificial neural network according to an embodiment of the present invention.

Referring to FIG. 9, first, a device for synthesizing a multi-speaker speech generates a speech learning model for a plurality of users based on speech data of the plurality of users (S901).

Next, the device for synthesizing a multi-speaker speech generates a first speaker vector that is a speaker vector of a new speaker and second speaker vectors that are speaker vectors of the plurality of users (S903).

Subsequently, the device for synthesizing a multi-speaker speech may determine a third speaker vector having the highest correlation with the first speaker vector (the highest similarity score) among the plurality of second speaker vectors (S905).

Then, the device for synthesizing a multi-speaker speech predicts a new speaker vector of the new user (speaker) based on the third speaker vector and the first speaker vector (S907).

Finally, the device of synthesizing a multi-speaker speech learns a new speaker vector based on an adversarial training method (S909).

In a method and a device for synthesizing a multi-speaker speech using an artificial neural network according to one embodiment, learning is performed on a voice of a new user based on a speech learning model of a user that has the most similar characteristics to the voice of the new user and is trained in advance, thereby synthesizing the voice of the new user only with relative less data unlike a related art.

Accordingly, there is an advantage in that a speaker vector for speech data of a new speaker data can be efficiently processed without a fine-tuning process.

So far, a method and device for synthesizing multi-speaker speech using artificial neural network according to the embodiment have been described in detail.

On the other hand, the constitutional elements, units, modules, components, and the like stated as "~part or portion" in the present invention may be implemented together or individually as logic devices interoperable while being individual. Descriptions of different features of modules, units or the like are intended to emphasize functional embodiments different from each other and do not necessarily mean that the embodiments should be realized by individual hardware or software components. Rather, the functions related to one or more modules or units may be performed by individual hardware or software components or integrated in common or individual hardware or software components.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof.

The processes and logic flows described in this specification can be performed by one or more programmable processors executing one or more computer programs to perform functions by operating on input data and generating output.

This written description sets forth the best mode of the present invention and provides examples to describe the present invention and to enable a person of ordinary skill in the art to make and use the present invention. This written description does not limit the present invention to the specific terms set forth.

While the present invention has been shown and described with reference to certain embodiments thereof, it will be understood by those skilled in the art that various changes in forms and details may be made therein without departing from the spirit and scope of the present invention as defined by the appended claims and their equivalents. Therefore, the technical scope of the present invention may be determined by on the technical scope of the accompanying claims.

What is claimed is:

1. A computer-implemented method of synthesizing a multi-speaker speech using an artificial neural network, the method executed by a processor and comprising:

generating a speech learning model for a plurality of users based on speech data of the plurality of users using a multi-speaker speech synthesis model comprising an encoder, an attention module, a decoder, and a vocoder;

generating a first speaker vector for speech data of a new speaker and a plurality of second speaker vectors for the new speaker by encoding an extracted d-vector from the speech data of the new speaker and retrieving a plurality of second speaker vectors for the plurality of users from a trained speaker vector table;

determining a third speaker vector having a highest correlation with the first speaker vector among the plurality of second speaker vectors based on a preset criterion;

predicting a new speaker vector of a new user based on the third speaker vector and the first speaker vector using an adversarial training method;

wherein the predicting the new speaker vector of the new user includes performing predicting based on a pronunciation duration time extracted from each of the speech data of the new speaker and speech data of a third speaker who is a speaker of the third speaker vector, and training an initial embedding predictor and an adversarial discriminator in an adversarial training arrangement by updating network weights based on a reconstruction loss between an actual speaker vector and the predicted new speaker vector and a discriminator loss, and storing the updated trained network weights in a non-transitory memory.

2. The method of claim 1, wherein the predicting the new speaker vector of the new user uses a feature vector extracted from the speech data of the new speaker.

3. The method of claim 2, wherein the predicting the new speaker vector of the new user includes calculating a cosine similarity value based on calculated inner product values and determining a speaker vector of a user, which has a greatest cosine similarity value among the plurality of users, to be the third speaker vector and wherein the cosine similarity value is weighted by average phoneme duration of each compared speaker.

4. A device for synthesizing a multi-speaker speech using an artificial neural network, the device comprising:

one or more processors; and one or more tangible, non-transitory memory devices storing instructions that, when executed by the one or more processors, cause the device to:

generates a speech learning model for a plurality of users based on speech data of the plurality of users using a multi-speaker speech synthesis model comprising an encoder, an attention module, a decoder, and a vocoder;

generates a first speaker vector for a new speaker by encoding an extracted d-vector from the speech data of the new speaker and retrieve a plurality of second speaker vectors for the plurality of users from a trained speaker vector table;

determine a third speaker vector having a highest correlation with the first speaker vector among the plurality of second speaker vectors based on a preset criterion, predicts a new speaker vector of a new user based on the third speaker vector and the first speaker vector using an adversarial training method based on a pronunciation duration time extracted from each of the speech data of the new speaker and speech data of a third speaker who is a speaker of the third speaker vector; and train an initial embedding predictor and an adversarial discriminator in an adversarial training arrangement by updating network weights based on a reconstruction loss between an actual speaker vector and the predicted new speaker vector and a discriminator loss, and store the updated trained network weights in the non-transitory memory devices.

5. The device of claim 4, wherein the instructions, when executed by the one or more processors cause the device to:

use a feature vector extracted from the speech data of the new speaker.

6. The device of claim 5, wherein the instructions, when executed by the one or more processors cause the device to:

calculate a cosine similarity value based on calculated inner product values and determines a speaker vector of a user, which has a greatest cosine similarity value among the plurality of users, to be the third speaker vector.

* * * * *